(12) United States Patent
Eves et al.

(10) Patent No.: US 7,930,628 B2
(45) Date of Patent: Apr. 19, 2011

(54) ENABLED DEVICE AND A METHOD OF OPERATING A SET OF DEVICES

(75) Inventors: David A. Eves, Crawley (GB); Richard S. Cole, Redhill (GB)

(73) Assignee: AMBX UK Limited, Surrey (GB)

( * ) Notice: Subject to any disclaimer, the term of this patent is extended or adjusted under 35 U.S.C. 154(b) by 1746 days.

(21) Appl. No.: 10/143,639

(22) Filed: May 10, 2002

(65) Prior Publication Data

US 2003/0061400 A1    Mar. 27, 2003

(30) Foreign Application Priority Data

May 11, 2001 (GB) .................................. 0111431.3
Mar. 27, 2002 (GB) .................................. 0207306.2

(51) Int. Cl.
*G06F 17/00* (2006.01)
(52) U.S. Cl. ............ 715/234; 715/757; 463/30; 463/31; 463/35
(58) Field of Classification Search .................. 345/329, 345/30–35; 318/568.17; 709/201, 203, 321; 715/513, 234, 757
See application file for complete search history.

(56) References Cited

U.S. PATENT DOCUMENTS

| 5,844,392 | A | * | 12/1998 | Peurach et al. | .......... 318/568.17 |
| 5,887,118 | A | | 3/1999 | Huffman et al. | .............. 392/390 |
| 6,161,126 | A | * | 12/2000 | Wies et al. | ..................... 709/203 |
| 6,166,744 | A | * | 12/2000 | Jaszlics et al. | ................ 345/629 |
| 6,288,716 | B1 | * | 9/2001 | Humpleman et al. | ........ 715/733 |
| 2002/0010734 | A1 | * | 1/2002 | Ebersole et al. | .............. 709/201 |

FOREIGN PATENT DOCUMENTS

| EP | 0508939 A2 | 10/1992 |
| EP | 0992269 | 4/2000 |
| FR | 0508939 A2 | * 10/1992 |
| WO | WO9859282 | 12/1998 |

* cited by examiner

*Primary Examiner* — Doug Hutton
(74) *Attorney, Agent, or Firm* — Burns & Levinson LLP; Bruce D. Jobse, Esq.

(57) ABSTRACT

A markup language enabled device (17) comprises storage means (21) storing data, the data for enabling augmentation of an experience by providing extra functionality to a movie or a game for example. The device (17) further comprises transmitting means (23) for transmitting the data, receiving means (25) for receiving a real-world description in the form of an instruction set of a markup language and adjusting means (27) for adjusting one or more parameters of the device according to the description.

15 Claims, 5 Drawing Sheets

ENABLED DEVICE AND A METHOD OF OPERATING A SET OF DEVICES

Figure 1:
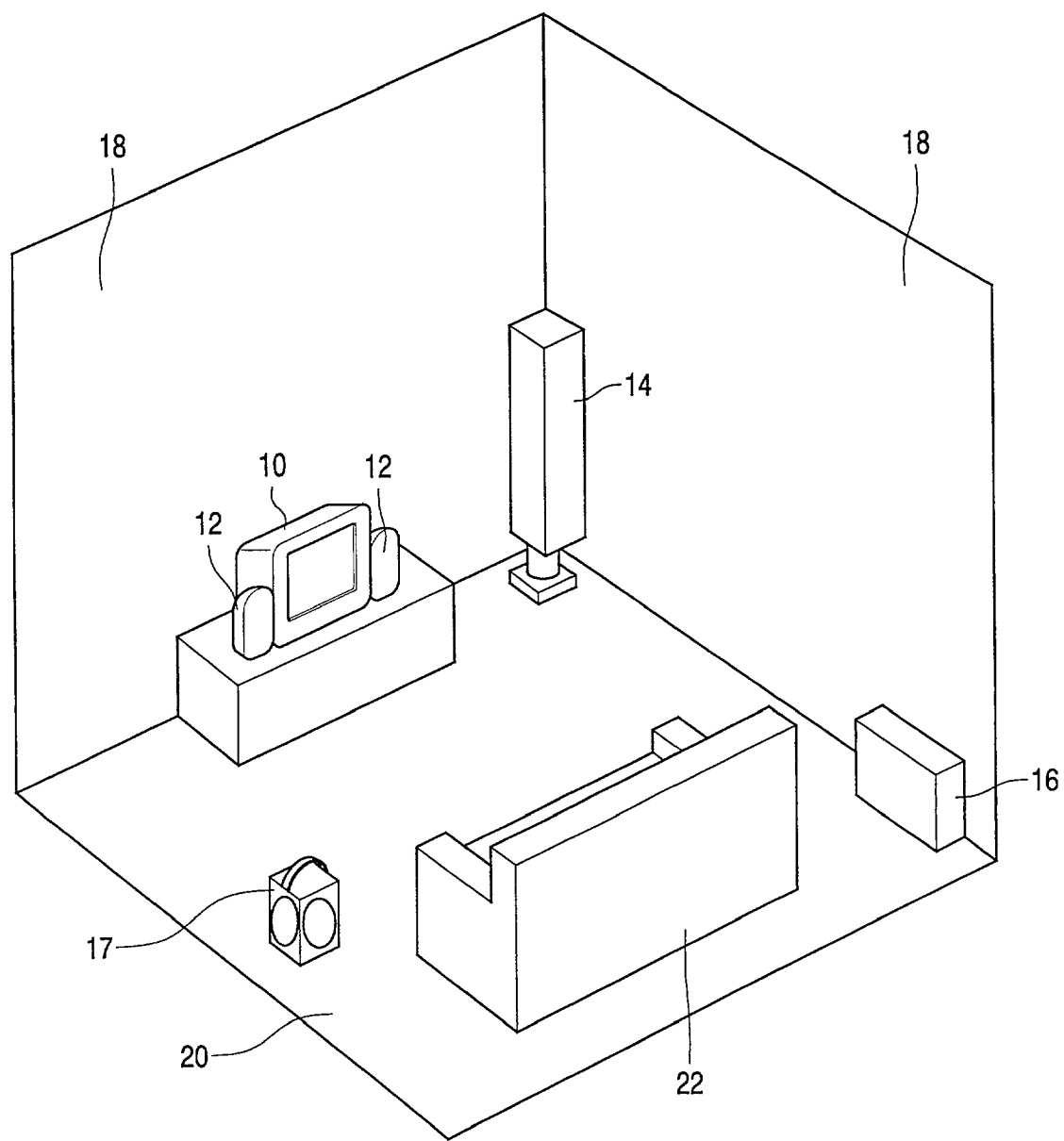

This invention relates to a markup language enabled device and a method of operating a set of devices.

In order to make the Internet accessible to a larger number of people HTML (HyperText Markup Language) was developed along with browsers that could read HTML files. HTML is a language that principally describes documents and links between documents. The browser reads the HTML code and displays the document comprised of the text and links on a PC screen. In order to extend the rather limited text only nature of HTML, JAVA was developed. JAVA is a programming language and a JAVA program (or applet as it is commonly referred to) is compiled from source to object code and is then addressed by an HTML link to produce graphics etc. in the right place on the screen as desired. I.e. an HTML document can include within it a link to a compiled JAVA applet. In due course, to further extend the information that can be transferred by the Internet, VRML was developed. VRML originally stood for Virtual Reality Markup Language, but the M is now more often referred to as standing for Modelling. VRML is a way of describing a three-dimensional place or object in terms of its geometry that can then be represented on a screen that is user navigable.

None of these languages can even begin to describe a real-world experience nor render it for the end user. Equally, none of these languages are suitable for use by devices for augmenting experiences.

It is known to provide a method of adding information for use by a program run on an entertainment apparatus. EP-A-0992269 describes a system in which additional information may be recorded in a recording medium. This allows game characters, backgrounds, etc. that can be used by a game program, for example, to be increased in number or added to provide extra enjoyment to the user.

However, the additional information provided to the entertainment apparatus does not add to the real-world experience of the user.

It is an object of the present invention to provide a device for use with entertainment apparatus that adds to the real-world experience of a user.

According to a first aspect of the present invention, there is provided a markup language enabled device comprising storage means storing data, said data for enabling augmentation of an experience, transmitting means for transmitting said data, receiving means for receiving a real-world description in the form of an instruction set of a markup language and adjusting means for adjusting one or more parameters of the device according to said description.

Owing to this aspect of the invention, it is possible to provide a device for transmitting additional information to a system which provides a real-world experience and can, itself, add to the real-world experience.

Advantageously the device may be arranged to provide extra functionality to an audio/video stream, such as a movie, or a game in response to the received instruction set. This may be achieved by adjusting its sound, light, odor or haptic output. The device may comprise animatronic functionality. Therefore, a user can increase the enjoyment of an entertainment system application by introducing an additional markup enabled device of this kind which adds to the overall real-world experience associated with that application.

The data may comprise a computer-readable program, an instruction set of a markup language and/or a URL. This stored data may be transmitted to part of a real-world representation system to provide additional information to enable an increase in the real-world description. Preferably, the data is transmitted via a wireless network or by a powerline carrier network.

Advantageously the receiving means of the device includes part of a distributed browser stored on a record carrier, the part interpreting the instruction set and communicating with the adjusting means. The browser can be arranged to interpret descriptions of a general type to generate specific parameter instructions for communicating to the adjusting means.

According to a second aspect of the invention, there is provided a method of operating a set of devices for providing a real-world experience comprising receiving a markup language enabled device, transmitting data from said device, said data for enabling augmentation of said experience, receiving a real-world description in the form of an instruction set of a markup language and operating at least one of said set of devices according to said description.

Owing to this aspect of the invention, it is possible to provide an improved real-world experience enabled by data transmitted from a markup enabled device, the device itself rendering part of a received real-world description.

The method advantageously further comprises distributing the description amongst the devices or reading the description at a local server. The description may form part of a broadcast signal and/or it may relate to an activity that a user is undertaking.

Figure 2:
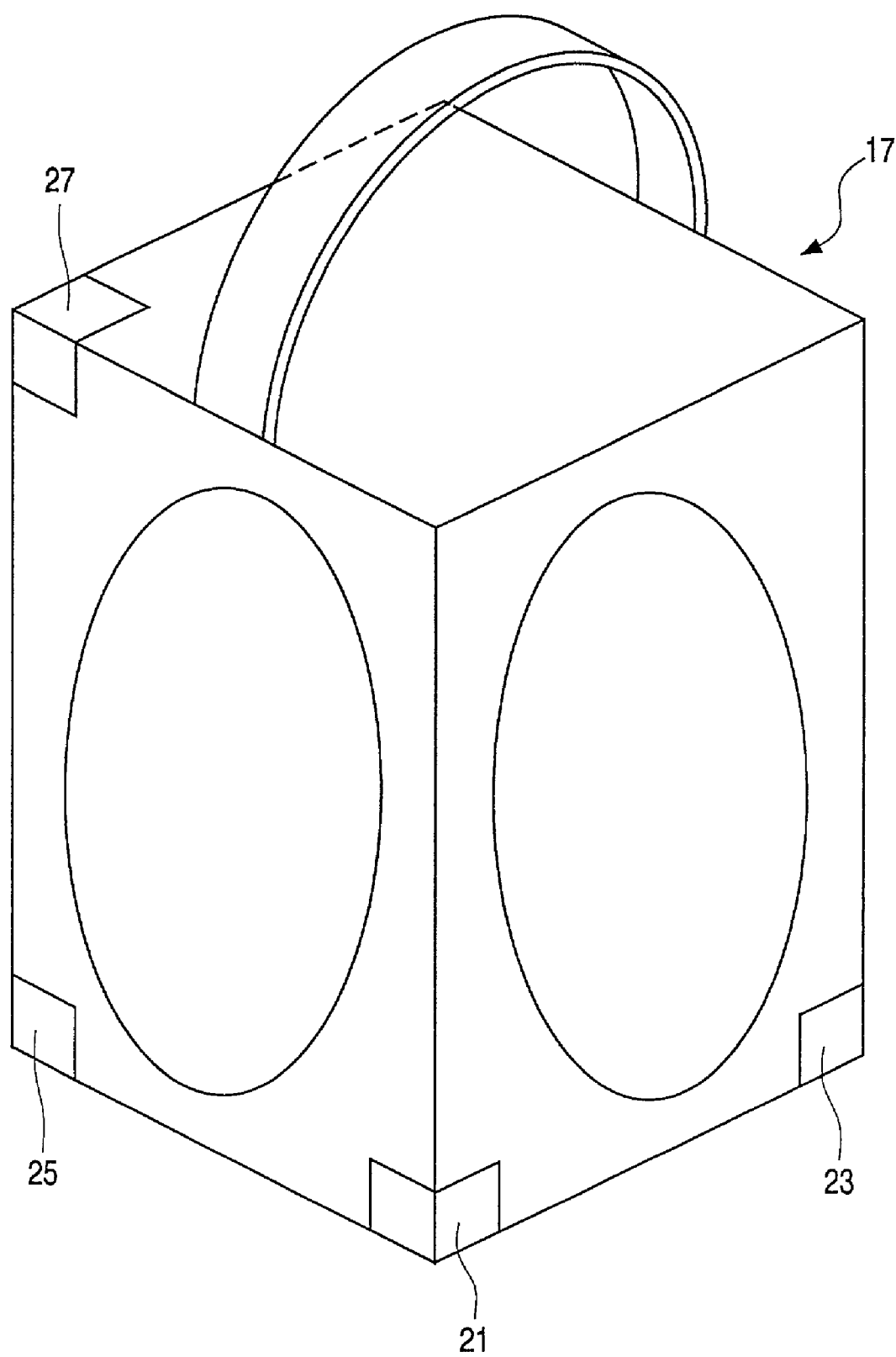
Figure 3:
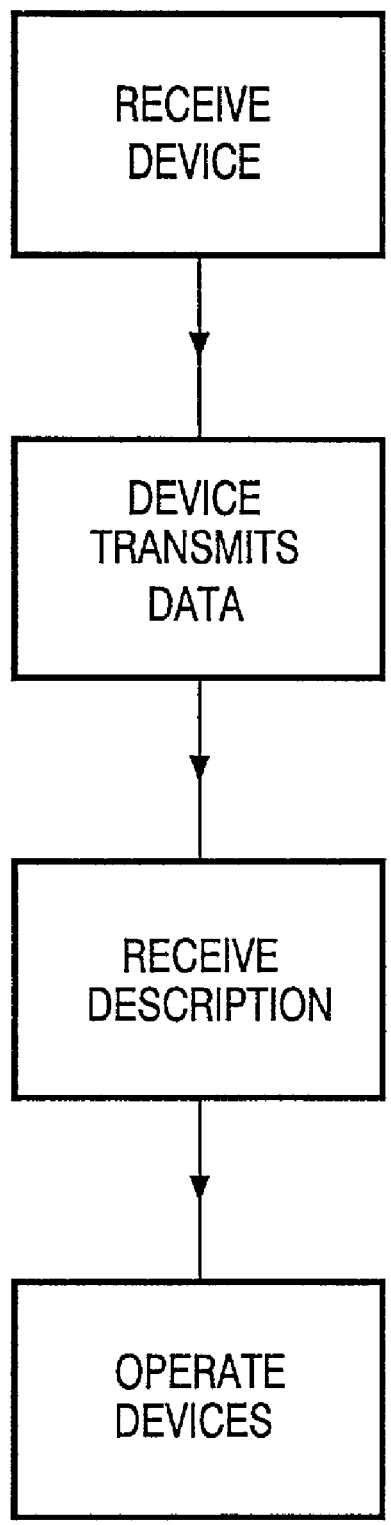
Figure 4:
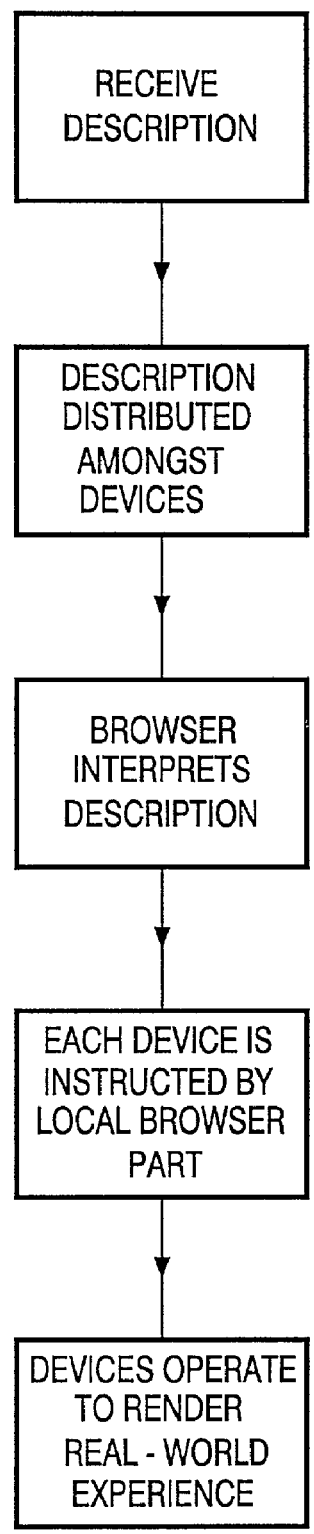
Figure 5:
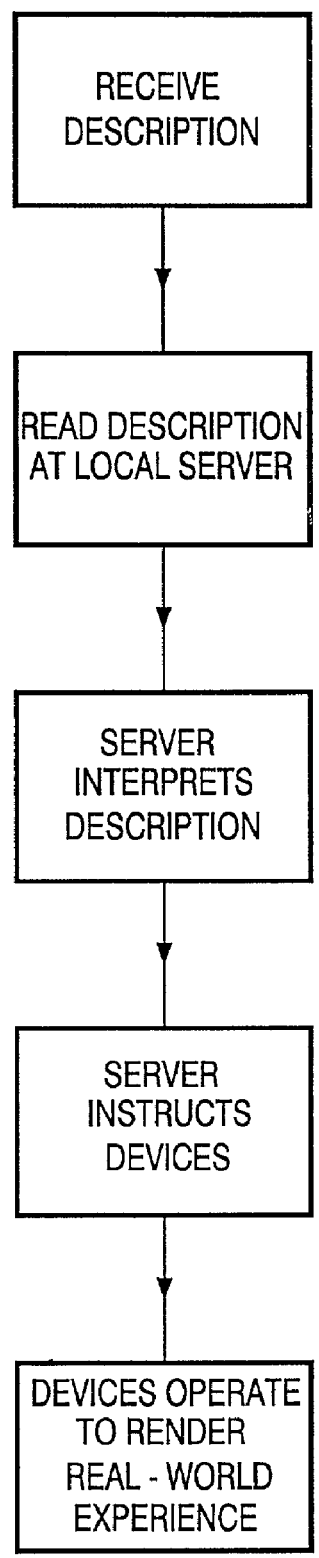

Embodiments of the invention will now be described, by way of example only, with reference to the accompanying drawings, in which:

FIG. 1 is a schematic perspective view of a real-world representation system and an augmenting device, FIG. 2 is a perspective view of the augmenting device of FIG. 1, FIG. 3 is a flowchart of a method of operating a set of devices, FIG. 4 is a flowchart of a method of controlling a set of devices, and FIG. 5 is a flowchart of an alternative method of controlling a set of devices.

In FIG. 1 the real-world representation system comprises a set of devices including a display device 10, audio speakers 12, a lighting device 14, a heating device 16, walls 18 and the floor 20. These devices together contribute to make up the ambient environment, each device being arranged to provide one or more real-world parameters. For example, the lighting device 14 contributes colour tones as well as to the luminance level. The devices may be electronic or they may be purely mechanical. The devices are interconnected by either a wireless network or a wired network such as a powerline carrier network.

In addition to the display device 10, the walls 18 and floor 20 are provided with display functionality. This can be achieved either by the walls 18 and floor 20 being composed of fabric display material, or a centred ceiling projector can illuminate the visible portions of the walls 18 and the floor 20. It is also feasible to back light the walls 18 if the environment allows it.

At least one of the devices making up the real-world representation system is arranged to receive a real-world description in the form of an instruction set of a markup language, the devices being operated according to said description. In this example, this description augments a computer game that a user is playing. As different environments are encountered by the user's character, a description is transmitted to the devices in the system. The devices then render this description.

The augmenting device 17 (shown in more detail in FIG. 2) is a markup language enabled device serving to increase the functionality of the real-world representation system. A user would purchase the augmenting device 17 to improve their enjoyment of, for example, a game that includes a real world description in the form of an instruction set of a markup language. The augmenting device 17 is arranged to provide extra functionality to a game in response to the received instruction set.

The device 17 comprises storage means 21 storing data, the data for enabling augmentation of the experience and thereby adding functionality to the real-world representation system. The device 17 further comprises transmitting means 23 for transmitting the data and receiving means 25 for receiving a real-world description in the form of an instruction set of a markup language. In addition, the device comprises adjusting means 27 for adjusting one or more parameters of the device according to said description.

In a method of operating the set of devices (outlined in the flowchart of FIG. 3), the augmenting device 17 is received. This may, for example, involve the device 17 being brought into a room where a real-world representation system is located. Data is transmitted from the device, the data for enabling augmentation of a real-world experience. This data is received by at least one of the other devices in the system and enables information about the functionality of the device 17 to be received by the system. A real-world description in the form of an instruction set of a markup language is received and at least one of the set of devices is operated according to the description.

For example, the game may comprise a scene in a forest on a summer evening. At this point in the game, the various markup enabled devices adjust their parameters accordingly. The augmenting device, representing an oil-burning lamp 17 in this case, may be introduced into the game in which, previously, the feature of a lamp did not exist, thereby becoming part of the real-world representation system. Data stored on storage means 21 is transmitted to the system by the transmitting means 23. This data comprises the information necessary to add the feature of the oil-burning lamp into the fantasy game being played and may comprise a computer-readable program, an instruction set of a markup language and/or a URL.

The system receives the data and the content of the real-world environment is adjusted accordingly. With the added functionality of the oil-burning lamp 17, the real-world description may read <FOREST>, <SUMMER>, <EVENING>, <LAMP> for one scenario in the game for example. The various devices in the system receive the description and render the experience accordingly. In addition, the receiving means 25 of the oil-burning lamp 17 receives the description in the form of an instruction set of a markup language. In response to this, adjusting means 27 adjusts at least one parameter of the augmenting device 17. For example, the device may provide a light output and/or a odor output simulating that of an actual oil-burning lamp. Therefore, augmenting device 17 provides extra functionality to the game by introducing a new feature and adjusting its parameters so as to render the experience to include that feature in the game.

There are two alternative methods of delivering the description to the devices making up the real-world representation system.

In a first method (outlined in the flowchart of FIG. 4) the description is distributed amongst the devices. Each markup language enabled device operates in principally the same manner. For example, the lighting device 14 has receiving means for receiving the real-world description in the form of an instruction set of a markup language, the receiving means including part of a distributed browser that interprets the instructions of the instruction set. The portion of the browser in the receiving means communicates with adjusting means that is arranged to adjust one or more parameters of the lighting device 14. For example, if the real-world description reads <FOREST>, <SUMMER>, <EVENING> then the browser part in the receiving means interprets this into specific instructions relating to the colour tones and luminance level for the adjusting means to adjust their levels accordingly. In this example the likely colour tone would be a pleasant green and the light level would be low but warm. The browser part interprets instructions of a general type to generate specific parameter adjustments.

The description is received by all of the other parts of the distributed browser in each of the other devices in the real-world representation system. Each device interprets the instructions and adjusts its parameter configuration accordingly. The more enabled devices that are present in a particular environment the more realistic the end result will be. In particular the operability of the walls 18 and floor 20 as display devices will determine how immersed in the real-world representation the user feels.

In a second method (outlined in the flowchart of FIG. 5) the description is read at a local server, which can be a dedicated device or could be contained within the capability of a device that nominally has a different purpose. In this embodiment a browser or operating system present on the local server interprets the instructions of the real-world description and generates specific parameter adjustments for communicating to the relevant device. In this way devices currently available can be used without the requirement that they be modified or purpose built for use in the real-world representation system.

This description could form part of a broadcast signal or it could be recalled from a local or remote store. The description could relate to an activity that a user is undertaking or could be triggered from a user interface or could trigger automatically from some predefined event, for example, a user entering a room.

The inclusion of the description in a broadcast signal allows the user to be immersed in an environment that is linked to a broadcast that he is receiving, for example a broadcast television signal. I.e. if the user is watching a film, then as the film moves through various scenes in turn these can be rendered by the set of devices making up the real-world representation system. If an underwater scene is showing on the television then the broadcast could include a description <WATER>, <COLD> and this will be interpreted by the relevant parts of the system to render the real-world experience to the user, turning the lights blue etc. This description can be received at all locations where there is a real-world representation system operating and each individual system will render the experience to the best of the functionality of the devices in the system.

An alternative game application is a fantasy role-play game. This involves characters and/or objects interacting with one another. Possible augmenting devices may include such characters or objects so that new and different ones can be added into the game. For example, an augmenting device in the guise of a toy soldier may be introduced into a game. Data stored on the storage means may comprise information about the character portrayed by this device and corresponding dialogue that the character may output as sound during the game. The data is transmitted to a browser distributed amongst the various other markup enabled devices in the room. These devices may include other similar characters or objects which already feature in the game. The real-world description is adapted when an augmenting device (a toy soldier in this example) is introduced into the game in order to render the experience of its presence. The device receives a real-world description in the form of an instruction set of a markup language and adjusts at least one of its parameters according to the description. This may include dialogue as sound output, flashing light as light output or even animatronics (actual movement of the device). The device may have the ability to detect its position in relation to the room and transmit this information to the browser so as to interface to the game. The description received by the device may then be dependant on the location of the device such that, in the example of the soldier, both the room environment and the actions of the soldier reflect the soldier's position in the room. The real-world description may be different for different characters and objects.

An augmenting device may comprise display means in which an image may be displayed as video output. Alternatively, the device may comprise a haptic (touch) input/output device such as a haptic (or force) display.

Augmenting devices can be introduced into an environment to provide extra functionality to a broadcast audio/video stream that includes an instruction set. In this case, the device is arranged to provide extra functionality to the audio/video stream in response to the received instruction set. The device may compliment a particular movie. However, the device need not represent a feature that is actually present in the stream. For example, a markup enabled device may be in the shape of a figurine which provides narration for that movie by producing dialogue as sound output and/or by making corresponding gestures. The data comprising the narration information is stored on the storage means of the device and transmitted to the browser or server.

The description can also relate directly to an activity that a user is undertaking, for example, reading a book. The individual pages of the book can trigger different descriptions being passed to the real-world representation system. Each description is linked by content to the particular theme or scene of the book at the respective point in the book. For example, the children's story "Little Red Riding Hood" has a number of discrete scenes within it, including a forest and the interior of a cottage, each of which can be rendered by the devices of the system in turn depending upon the place in the story that the reader has reached. A movement sensor may be employed to detect the turning of the pages, or the book may have inbuilt functionality that automatically detects which page the reader is looking at and triggers the appropriate description that is then rendered by the system. The triggering is ideally carried out via a wireless connection.

A user can also operate the system in a relatively simple manner from a user interface such as a remote control, although equally an enabled PDA or other mobile terminal could be employed. The user can select an environment that they wish to be immersed in from preselected total descriptions or create a new environment from pre- or user-defined variables. Such a total description may, for example, be <CHINESE RESTAURANT>, which real-world experience is then rendered by the devices in the system. The real-worlds generated can be fantasy environments or they can be realistic.

The user can also operate the user interface to set limits on the operation of the devices in the system. For example, if the user wishes to set the volume of those devices with an audio capability to a specific range or set an upper limit on the volume then they can do so via the user interface. This prevents experiences becoming unpleasant for the user. The level of the light and the rate of any change in light intensity are also things that the user can control. All of the parameters of the system can be user defined.

The description of the real-world experiences is provided by a markup language that communicates a description of physical environments and the objects within them, their relationship to the user, each other and to the physical space. Within a location that is enabled to produce a real-world experience, the instruction set of the markup language is interpreted by a device or devices to render the experience. Each device that is enabled contains a component that interprets the instruction set to the best of its capability.

The language contains a wide range of states that can be rendered by the devices in a real-world representation system. Such states relate to:
   Image display—specific images, streamed video
   Audio—music, sound effects, voice
   Mood—emotional, ambient, animated
   Light—levels (relative/absolute), moods, colours, position, focus
   User display and input—feedback, menu display
   Time—time of day, season
   Location—absolute, fantasy, generic type.

Any information that relates to a physical experience can be expressed in this markup language as long as the browser or local server is arranged to interpret the description. To create instruction sets in the markup language an author can write directly into the language or a computer program for authoring an instruction set can be used. The authoring program can take data input in the form of, for example, text or video and can generate a set of instructions comprising a subset of the markup language that when passed to a real-world representation system will allow the devices in that system to render the experience that corresponds to that of the text or video.

The language is XML compliant, XML being a meta-language that describes the standard structure for new markup languages.

The invention claimed is:

1. A markup language enabled device included within an environment of physical objects, said device comprising:
   storage means storing data, said data for enabling augmentation of an experience in a real-world environment;
   transmitting means for transmitting said augmentation data;
   receiving means for receiving a real-world description in the form of an instruction set of a markup language, wherein the markup language includes a representation of the real world environment and said physical objects within the environment, their relationship to the user, and each other, and
   adjusting means for adjusting one or more parameters of the device according to said description, wherein the device is caused to be represented as a physical object within the environment.

2. A device according to claim 1, wherein said device is arranged to provide extra functionality to an audio/video stream in response to the received instruction set.

3. A device according to claim 2, wherein said audio/video stream comprises a movie.

4. A device according to claim 1 wherein said device is arranged to provide extra functionality to a game in response to the received instruction set.

5. A device according to claim 1, wherein a parameter is sound output.

6. A device according to claim 1, wherein a parameter is light output.

7. A device according to claim 1, wherein a parameter is an odor output.

8. A device according to claim 1, wherein a parameter is haptic output.

9. A device according to claim 1, wherein the device has animatronic functionality.

10. A device according to claim 1, wherein said data comprises a computer-readable program.

11. A device according to claim 1, wherein said data comprises an instruction set of a markup language.

12. A device according to claim 1, wherein said data comprises a URL.

13. A method of operating a set of devices for providing a real-world experience comprising:

receiving at a markup language enabled device, description in the form of an instruction set of a markup language, wherein the markup language includes a representation of the physical objects within said environment, their relationship to the user, and each other; and adjusting parameters of said device by transmitting augmentation data of said experience, wherein the device is further caused to be represented as an object within the environment.

14. A method according to claim 13, and further comprising distributing said description amongst the set of markup language enabled devices.

15. A method according to claim 13, and further comprising reading said description at a local server.

* * * * *